United States Patent
Schob et al.

(10) Patent No.: US 9,045,883 B2
(45) Date of Patent: Jun. 2, 2015

(54) SNUBBER FOR SHOVEL DIPPER

(75) Inventors: Dave Schob, Gilbert, AZ (US); Richard Nicoson, Hartford, WI (US); William R. Powers, Mukwonago, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 336 days.

(21) Appl. No.: 13/446,232

(22) Filed: Apr. 13, 2012

(65) Prior Publication Data

US 2012/0260538 A1 Oct. 18, 2012

Related U.S. Application Data (60) Provisional application No. 61/475,385, filed on Apr. 14, 2011.

(51) Int. Cl.
*E02F 3/40* (2006.01)
*E02F 3/407* (2006.01)
*E02F 9/22* (2006.01)
*F16F 9/14* (2006.01)

(52) U.S. Cl.
CPC ............. *E02F 3/4075* (2013.01); *E02F 9/2207* (2013.01); *E02F 9/2203* (2013.01); *F16F 9/145* (2013.01)

(58) Field of Classification Search
CPC ........... E02F 3/4075; E02F 3/40; E02F 3/407; E02F 9/22; E02F 9/2207; E02F 9/2214; F16F 9/10; F16F 9/103; F16F 9/14; F16F 9/145; F16F 9/187
USPC ................................ 37/442–445; 32/442–445
See application file for complete search history.

(56) References Cited

U.S. PATENT DOCUMENTS

| | | | | |
|---|---|---|---|---|
| 1,970,369 A | * | 8/1934 | Focht | 188/306 |
| 2,722,289 A | * | 11/1955 | Girard | 188/306 |
| 3,021,822 A | * | 2/1962 | Rumsey | 92/125 |
| 4,674,608 A | * | 6/1987 | Morris et al. | 188/290 |
| 4,723,639 A | * | 2/1988 | Hungerford | 188/307 |
| 4,768,630 A | * | 9/1988 | Aubry et al. | 188/290 |
| 4,926,984 A | * | 5/1990 | Pollitt | 188/310 |
| 4,938,322 A | * | 7/1990 | Sugasawara et al. | 188/290 |
| 5,197,419 A | * | 3/1993 | Dingess | 123/90.13 |
| 5,279,000 A | * | 1/1994 | Mercier et al. | 4/240 |
| 5,613,308 A | | 3/1997 | Little | |

(Continued)

FOREIGN PATENT DOCUMENTS

CA 2253258 8/2005

*Primary Examiner* — Robert Pezzuto
*Assistant Examiner* — Jessica H Lutz
(74) *Attorney, Agent, or Firm* — Michael Best & Friedrich LLP (57) ABSTRACT

A snubber for a mining shovel including a dipper body and a dipper door rotatably coupled to the dipper body. The snubber includes a housing having an internal wall defining a fluid-filled chamber, a shaft rotatably coupled to the housing and including a portion positioned within the chamber, a paddle positioned within the chamber, a dam positioned within the chamber, a first valve, and a second valve. Rotation of the dipper door relative to the dipper body causes rotation of the shaft relative to the housing. The paddle is coupled to the shaft such that the paddle rotates with the shaft. The dam and paddle substantially partition the internal chamber into a first portion and a second portion. The first valve controls fluid flow from the first chamber to the second chamber, and the second valve controls fluid flow from the second chamber to the first chamber.

25 Claims, 12 Drawing Sheets

(56) References Cited

U.S. PATENT DOCUMENTS

| | | |
|---|---|---|
| 5,735,067 A | 4/1998 | Isley et al. |
| 5,815,960 A | 10/1998 | Soczka |
| 5,974,705 A | 11/1999 | Isley et al. |
| 6,219,946 B1 | 4/2001 | Soczka |
| 6,467,202 B1 | 10/2002 | Brown, Jr. |
| 7,096,610 B1 | 8/2006 | Gilmore |
| 7,357,231 B2 * | 4/2008 | Kim et al. .................... 188/290 |
| 8,276,386 B2 * | 10/2012 | Ziminsky et al. ............... 60/738 |
| 2005/0252740 A1 * | 11/2005 | Fukukawa ..................... 188/290 |
| 2006/0070835 A1 * | 4/2006 | Kanno et al. ................... 188/290 |
| 2008/0277964 A1 * | 11/2008 | Kanno et al. ................. 296/146.1 |
| 2011/0239494 A1 | 10/2011 | Dube et al. |
| 2012/0252590 A1 * | 10/2012 | Yonezawa et al. ............ 464/180 |
| 2012/0286563 A1 * | 11/2012 | Lichterfeld et al. ............ 303/15 |
| 2013/0328342 A1 * | 12/2013 | Okimura et al. ................ 296/66 |
| 2014/0020994 A1 * | 1/2014 | Okimura et al. ............ 188/282.1 |

\* cited by examiner

SNUBBER FOR SHOVEL DIPPER

CROSS-REFERENCE TO RELATED APPLICATIONS

This application claims the benefit of U.S. Provisional Application 61/475,385, filed Apr. 14, 2011, the entire contents of which are incorporated herein by reference.

BACKGROUND

The present invention relates to mining shovels, and in particular a snubber for a shovel dipper.

Mining rope shovels generally utilize a dipper for digging into a bank of material. The dipper has a dipper door on the bottom surface of the dipper that is rotatably connected by a door pin. After filling the dipper, the operator positions the dipper over a loading vehicle and triggers a latch mechanism to release the dipper door. Under the weight of the material in the dipper, the door swings down and away from the dipper body about the door pin. After the payload has been transferred to the loading vehicle, the operator then moves the dipper against the ground, forcing the door to rotate against the dipper body and causing the latch to lock the door. To prevent the dipper door from slamming against the dipper body when it is closed and to prevent the door from slamming against the loading vehicle when it is opened, a hydraulic snubber is coupled between the dipper door and dipper body to dampen rotation of the door. Generally, a snubber is coupled to each side of the dipper so that the dipper door rotates evenly and does not tilt to one side.

Hydraulic snubbers utilize an internal chamber filled with hydraulic fluid to resist movement of a paddle in one rotational direction, thereby dampening rotation of the paddle when the door opens or closes. Since conventional snubbers dampen rotation in only one direction (i.e., only when the door either opens or closes), a separate snubber must be configured for each side of the dipper. Because snubbers generally are subject to extreme forces, the seals in a hydraulic snubber must be able to withstand significant pressure in order to sufficiently dampen rotation of the dipper door and control the release of material.

SUMMARY

In one embodiment, the invention provides a snubber for a mining shovel, the mining shovel including a dipper having a dipper body and a dipper door rotatably coupled to the dipper body. The snubber includes a housing including an internal wall defining a fluid-filled chamber; a shaft rotatably coupled to the housing and including a portion positioned within the chamber, wherein rotation of the dipper door relative to the dipper body causes rotation of the shaft relative to the housing; a paddle positioned within the chamber and coupled to the shaft such that the paddle rotates with the shaft; a dam positioned within the chamber such that the dam and the paddle substantially partition the internal chamber into a first portion and a second portion; a first valve for controlling fluid flow from the first chamber to the second chamber; and a second valve for controlling fluid flow from the second chamber to the first chamber.

In another embodiment, the invention provides a dipper for a mining shovel, the dipper including a dipper body for receiving material; a dipper door rotatably coupled to the dipper body, and a snubber. The snubber includes a housing including an internal wall defining a fluid-filled chamber; a shaft rotatably coupled to the housing and including a portion positioned within the chamber, the shaft being coupled to the dipper door such that rotation of the dipper door relative to the dipper body causes rotation of the shaft relative to the housing; a paddle positioned within the chamber and coupled to the shaft such that the paddle rotates with the shaft; a dam positioned within the chamber such that the dam and the paddle substantially partition the internal chamber into a first portion and a second portion; a first valve for controlling fluid flow from the first chamber to the second chamber; and a second valve for controlling fluid flow from the second chamber to the first chamber.

In yet another embodiment, the invention provides a snubber for a mining shovel, the mining shovel including a dipper having a dipper body and a dipper door rotatably coupled to the dipper body. The snubber includes a housing including an internal wall defining a chamber, the chamber defining a pivot axis; a shaft rotatably coupled to the housing and including a portion positioned within the chamber, the shaft being rotatable about the pivot axis in a first direction and a second direction, wherein rotation of the dipper door relative to the dipper body causes rotation of the shaft relative to the housing; a paddle positioned within the chamber and including a first end proximate the internal wall and a second end coupled to the shaft, the paddle rotating with the shaft about the pivot axis; and a valve assembly for dampening rotation of the paddle and shaft in the first direction and the second direction.

In still another embodiment, the invention provides a snubber for a mining shovel, the mining shovel including a dipper having a dipper body and a dipper door rotatably coupled to the dipper body, the snubber includes a housing, a shaft, and a means dampening rotation of the shaft in a first direction and a second direction. The housing includes an internal wall defining a chamber, and the chamber defines a pivot axis. The shaft is rotatably coupled to the housing and includes a portion positioned within the chamber. The shaft is rotatable about the pivot axis in the first direction and the second direction, wherein rotation of the dipper door relative to the dipper body causes rotation of the shaft relative to the housing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Furthermore, and as described in subsequent paragraphs, the specific configurations illustrated in the drawings are intended to exemplify embodiments of the invention and that other alternative configurations are possible.

Figure 1:
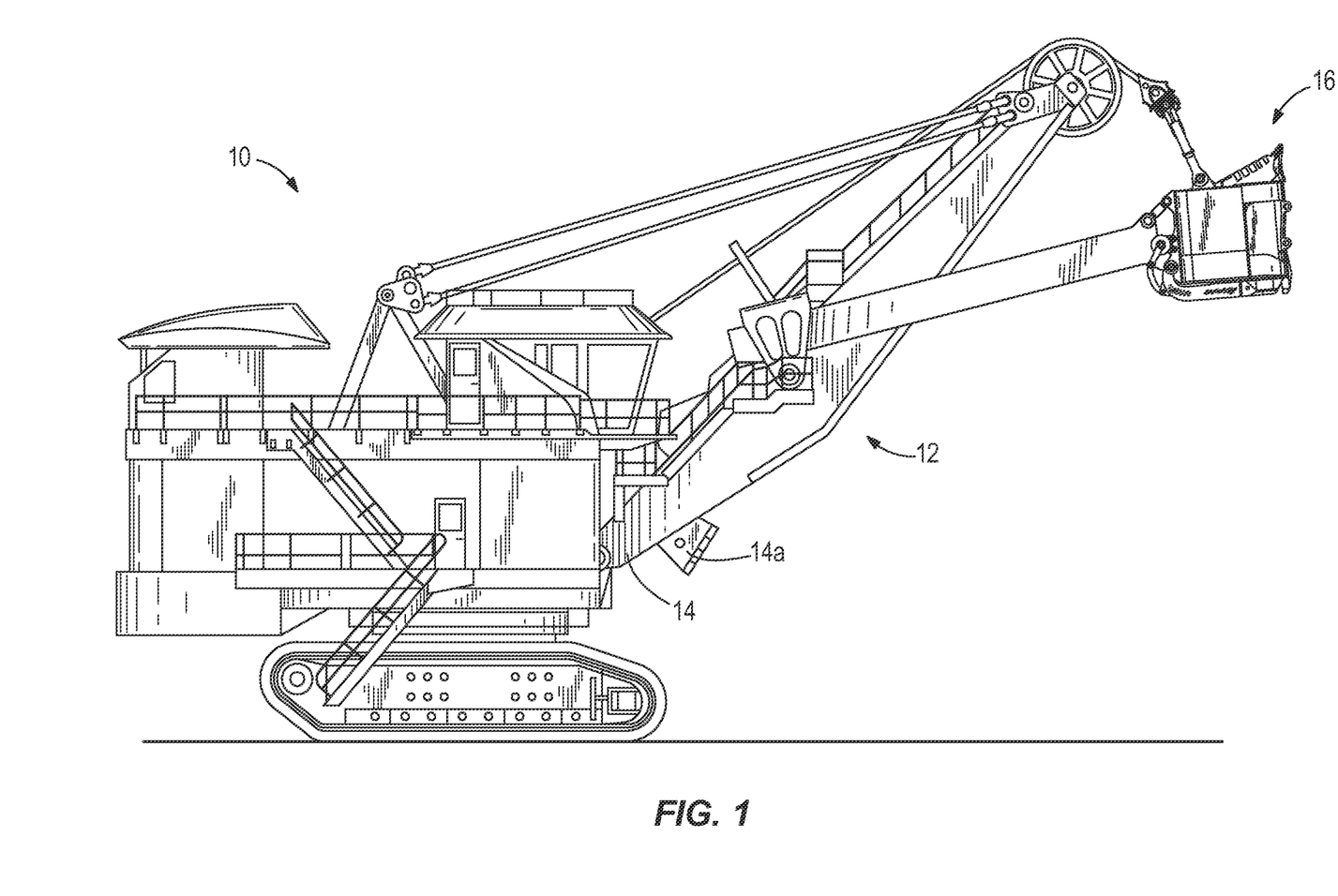
FIG. 1 is a side view of a mining shovel.
Figure 2:
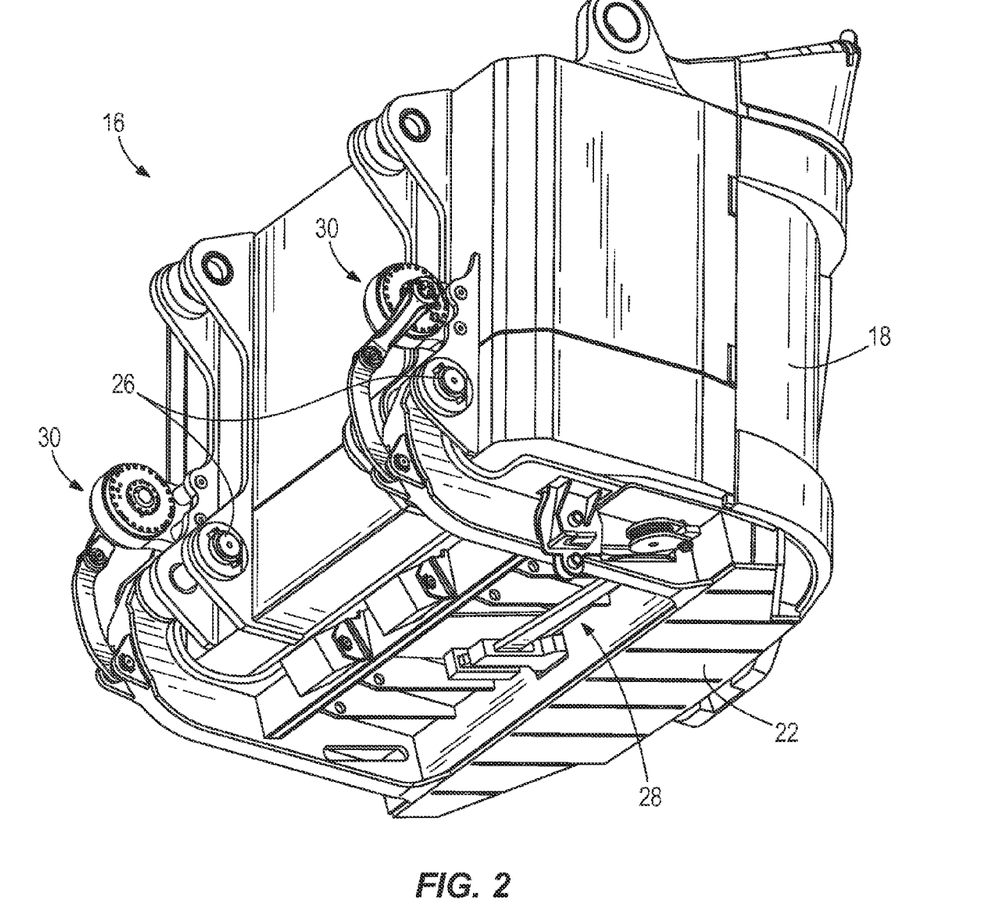
FIG. 2 is a perspective view of a dipper for the mining shovel.
Figure 3:
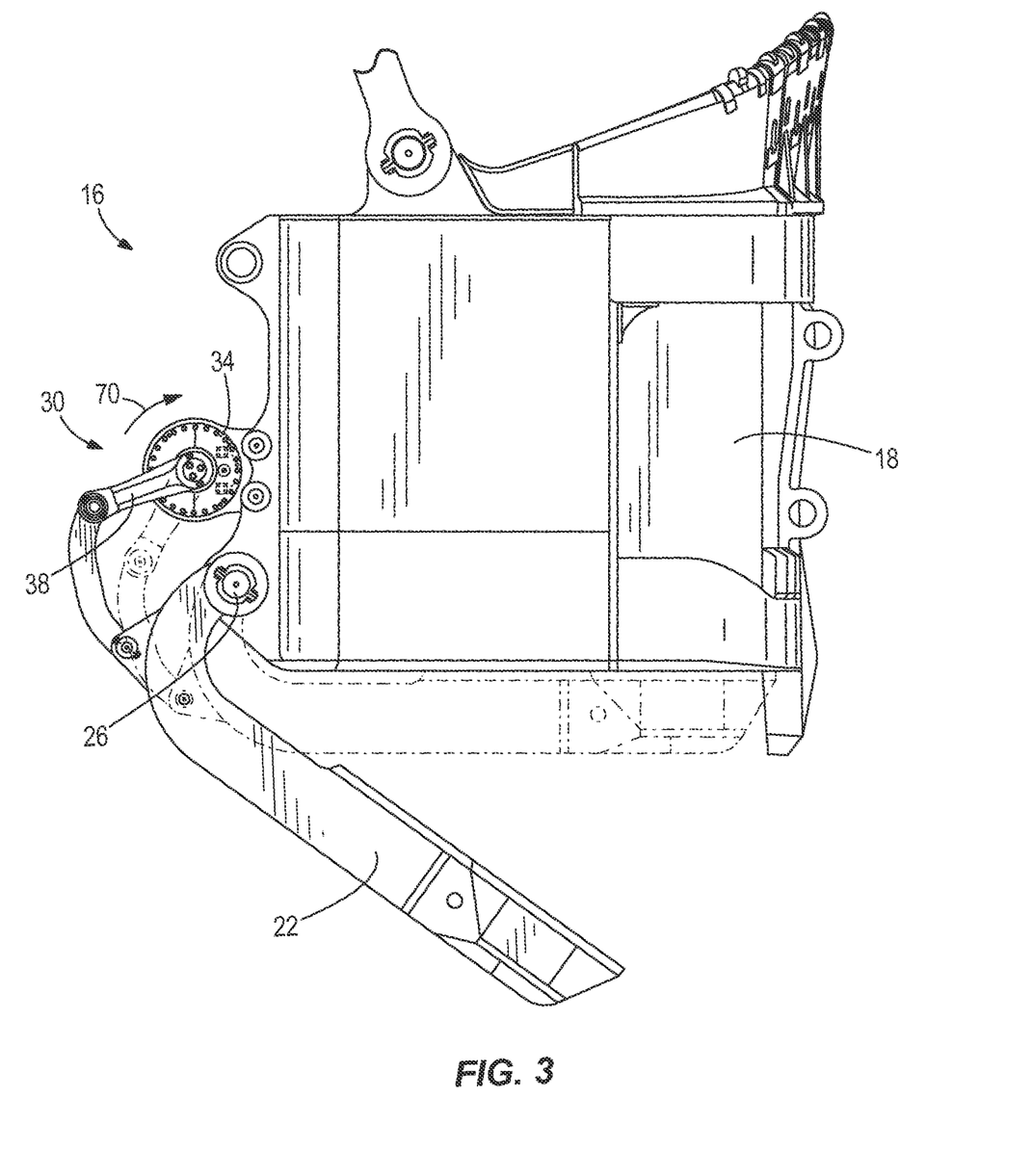
FIG. 3 is a side view of the dipper of FIG. 2 with the dipper door in an open position.
Figure 4:
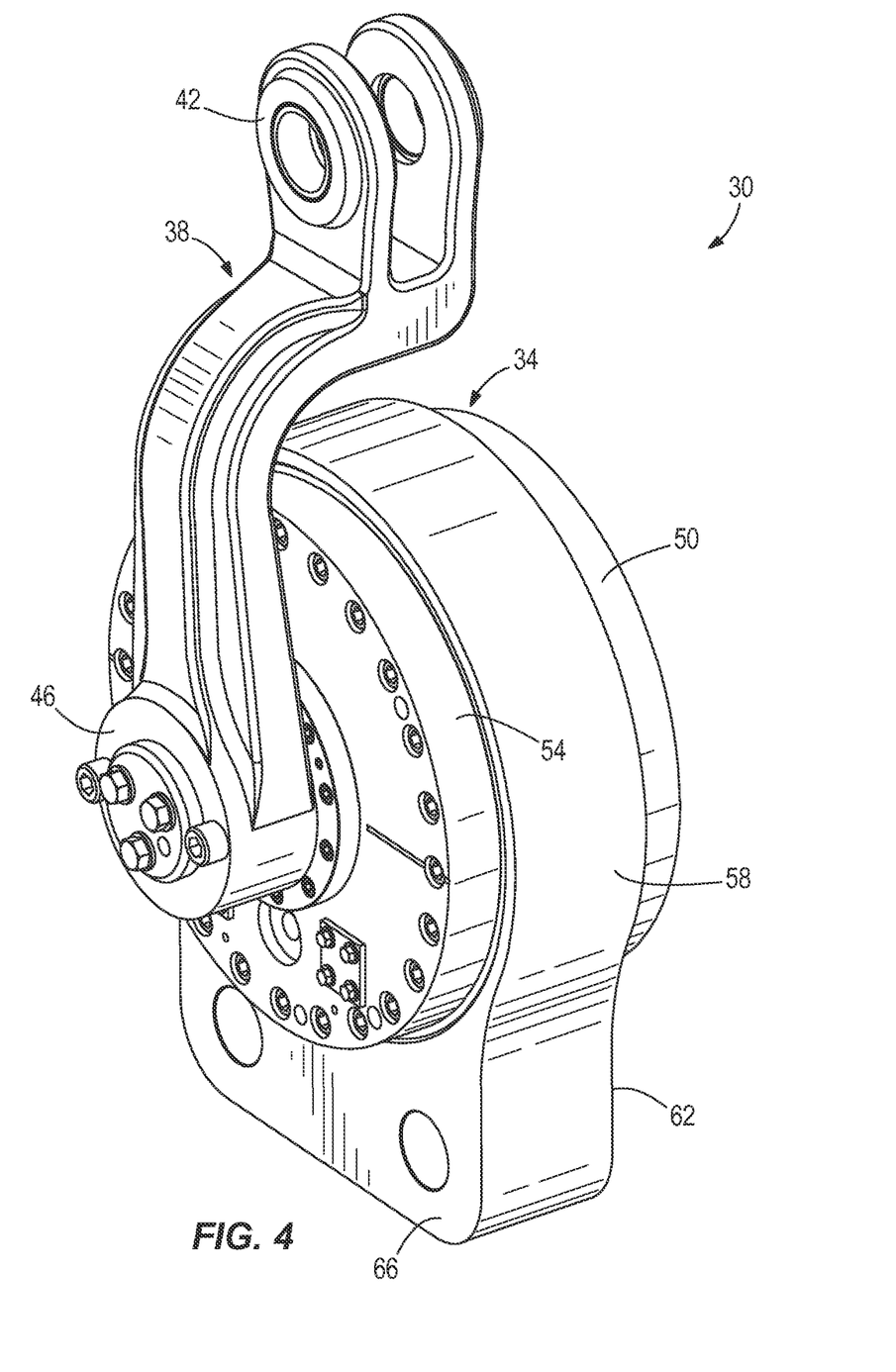
FIG. 4 is a perspective view of a snubber.
Figure 5:
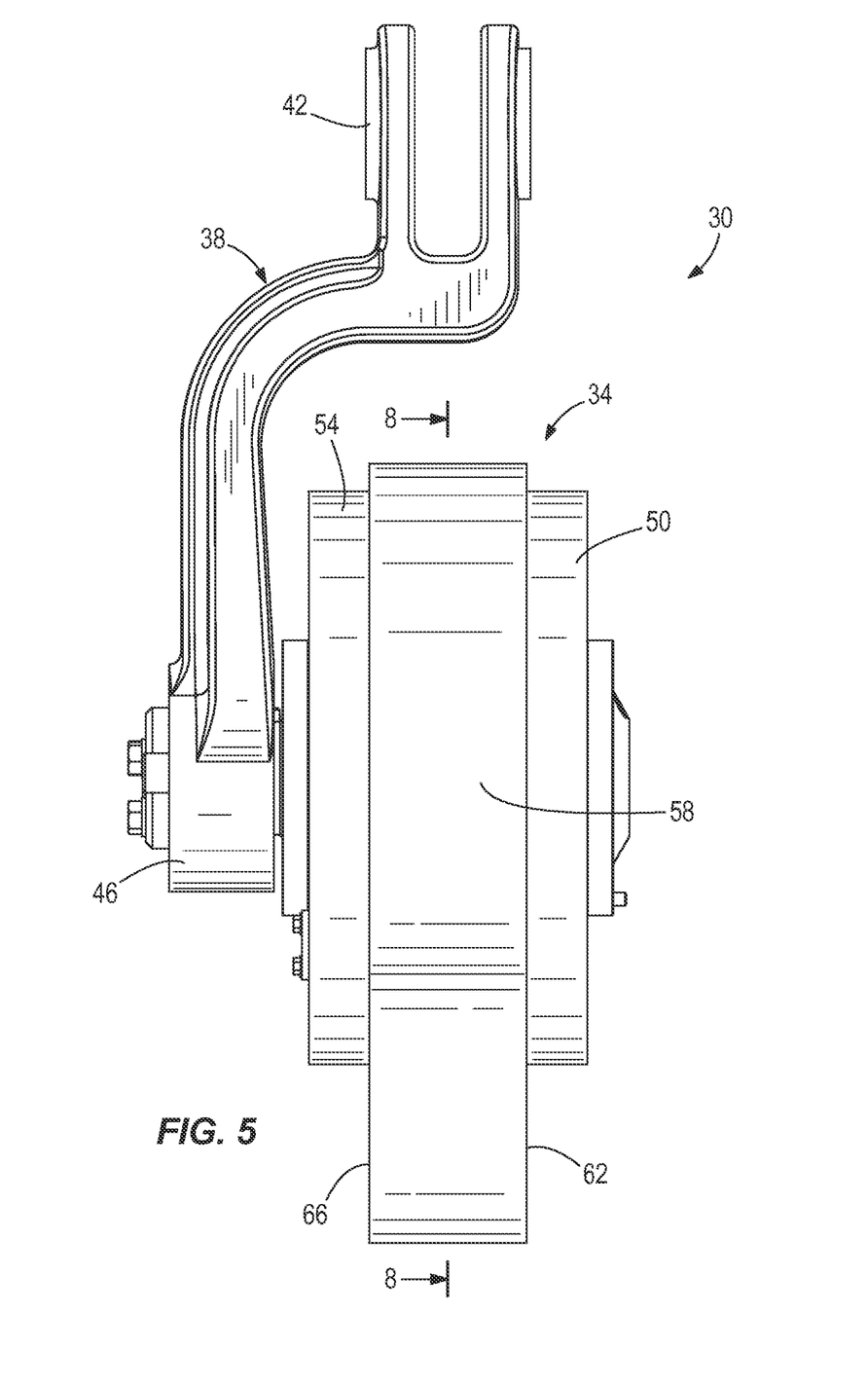
FIG. 5 is a side view of the snubber of FIG. 4.
Figure 6:
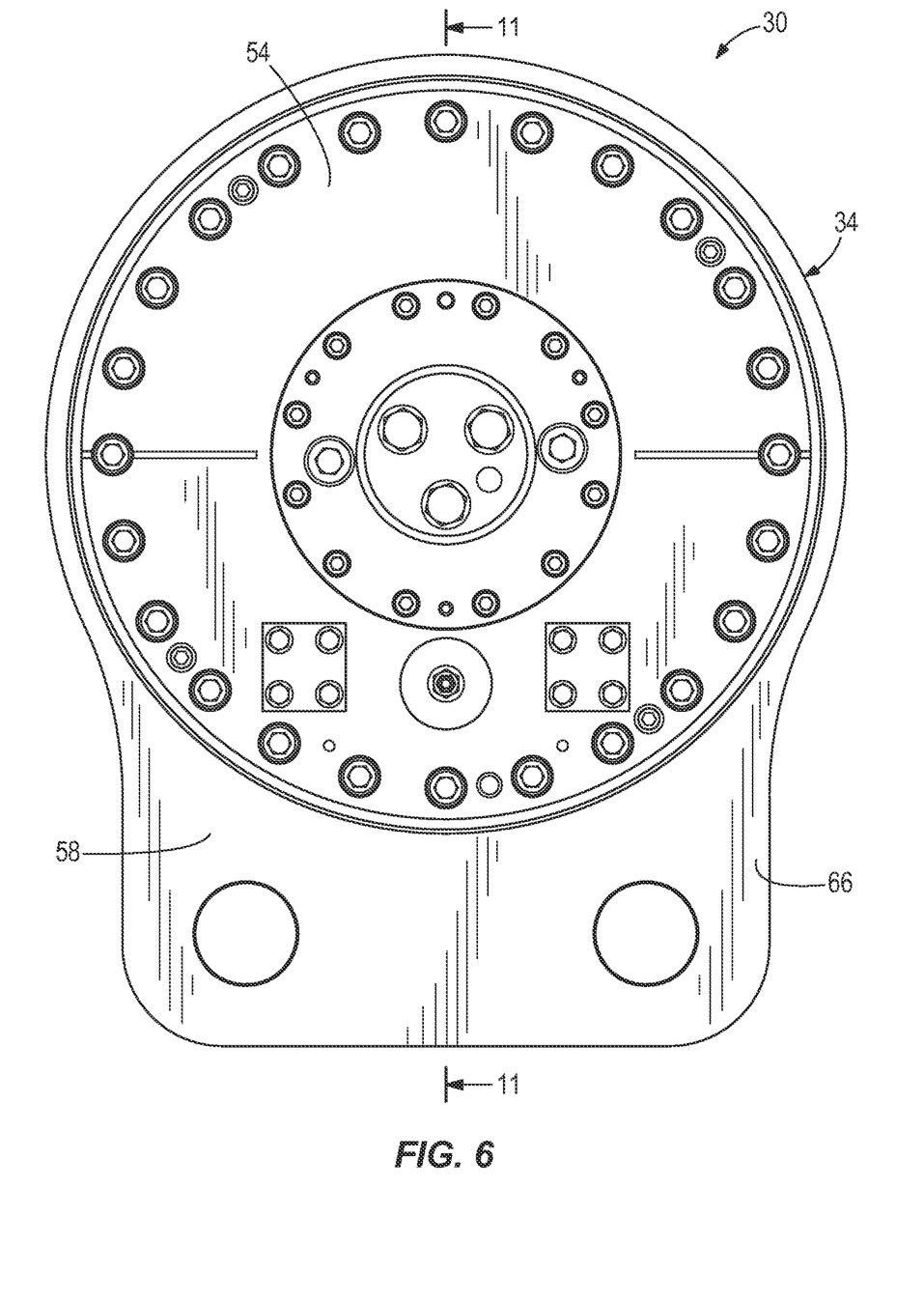
FIG. 6 is a front view of the snubber of FIG. 4, with a snubber arm removed.

FIG. 1 illustrates a mining shovel 10 including a boom 12 having a base 14 and a dipper 16. The base 14 includes a bumper 14a. As shown in FIG. 2, the dipper 16 includes a dipper body 18, a dipper door 22 rotatably coupled to the dipper body 18 by door pins 26, a latch mechanism 28, and a pair of snubber assemblies 30. As shown in FIGS. 4-6, each snubber 30 includes a housing 34 and a snubber arm 38. The snubber arm 38 includes a first end 42 coupled to the dipper door 22 and a second end 46. The housing 34 includes a first wall or cover 50 (FIG. 5), a second cover 54, and a main body 58 having a first side 62 and a second side 66. The first cover 50 is coupled to a first side 62, and the second cover 54 is coupled to a second side 66. The main body 58 is coupled to the dipper body 18. As the dipper door 22 opens (FIG. 3), the door 22 rotates about the door pin 26 and rotates the snubber arm 38 with respect to the housing 34. In the embodiment illustrated in FIG. 3, opening the door rotates the arm in a clockwise direction 70.

Figure 7:
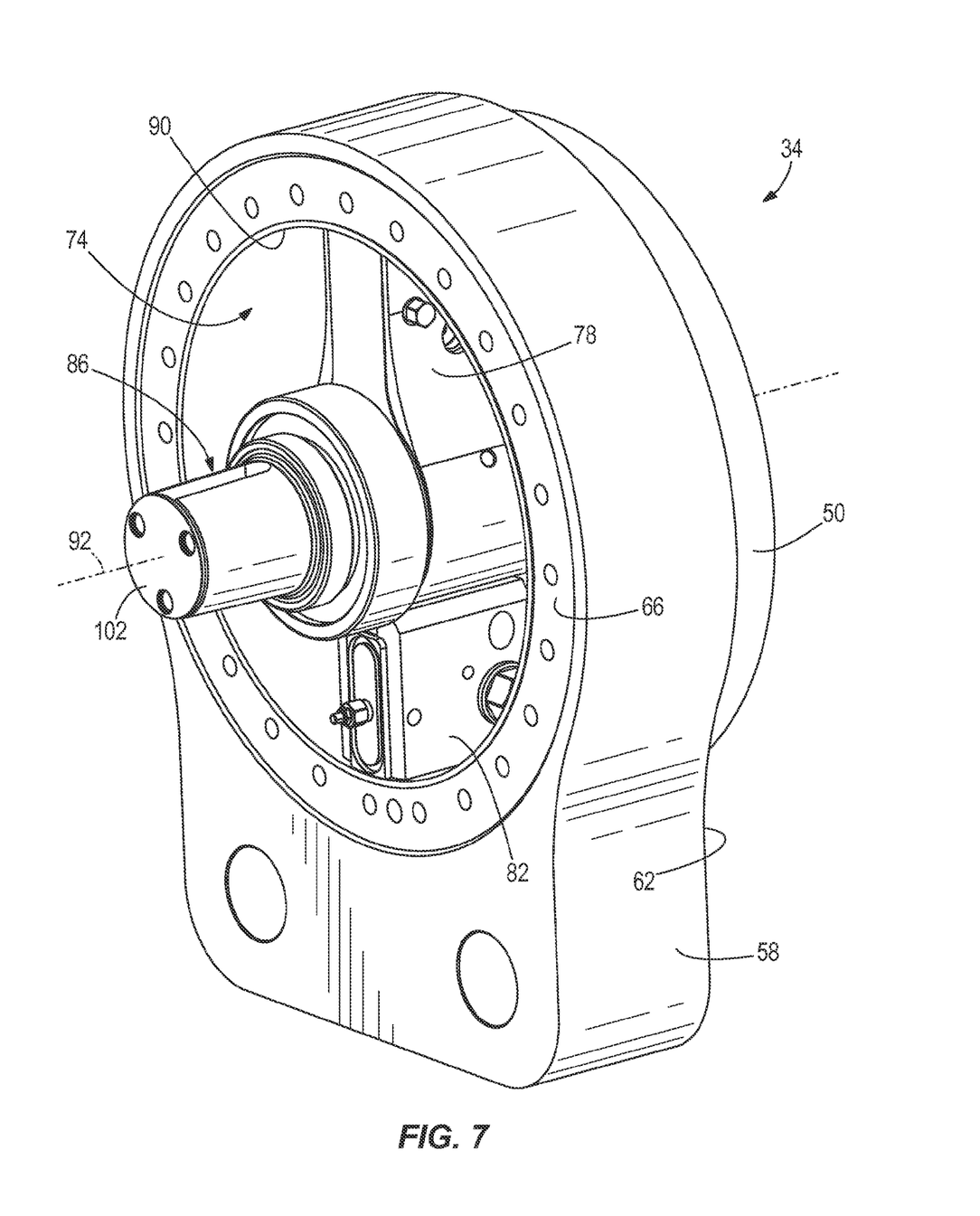
FIG. 7 is a perspective view of the snubber of FIG. 4, with a first cover and snubber arm removed.
Figure 8:
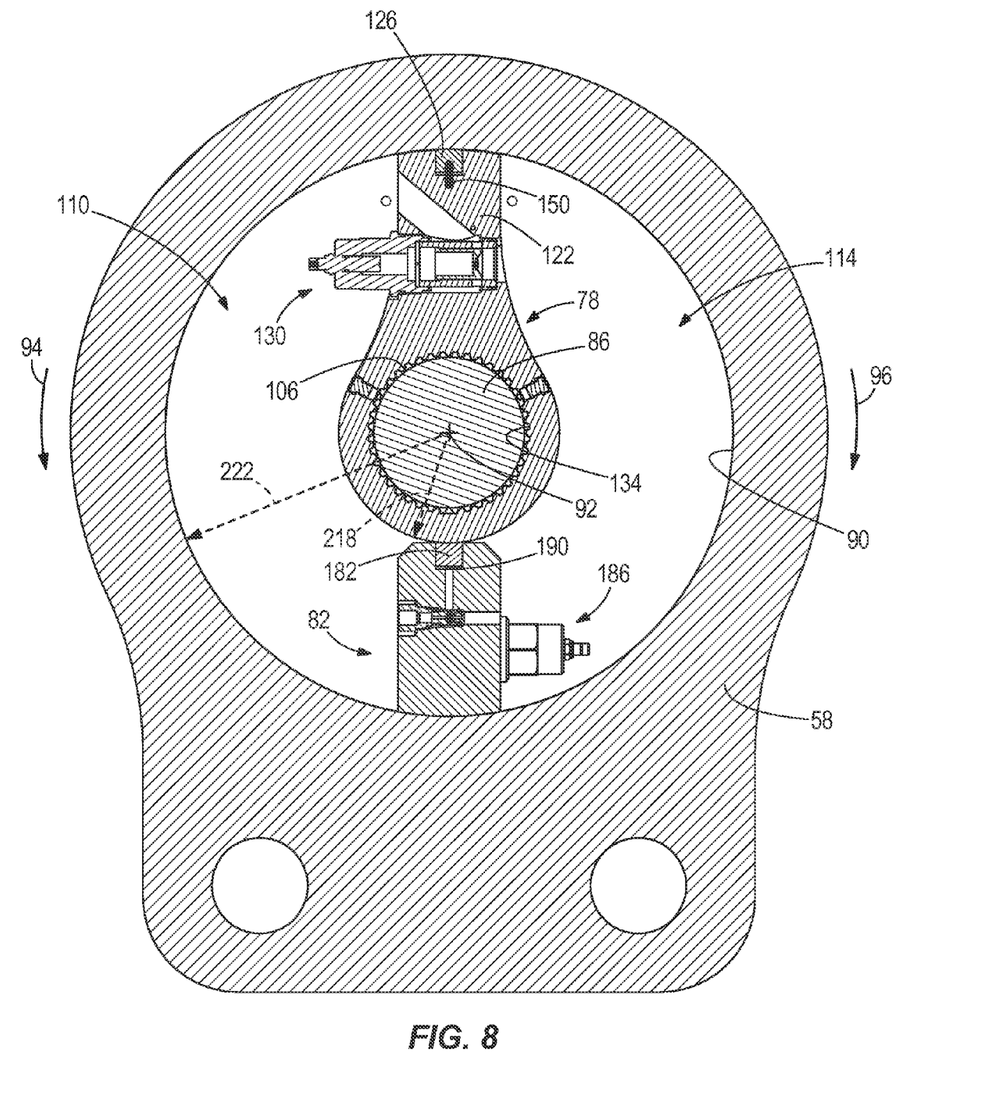
FIG. 8 is a section view of the snubber of FIG. 5, taken along section 8-8.

Referring to FIGS. 7 and 8, the main body 58 includes an interior chamber 74, a paddle 78, a dam 82, and a shaft 86. The chamber 74 is filled with hydraulic fluid and has a generally cylindrical shape. The chamber 74 is defined by a sealing wall 90 extending between the first side 62 of the main body 58 and the second side 66. In the illustrated embodiment, the sealing wall 90 has a cylindrical shape. The ends of the chamber 74 are defined by the first cover 50 (FIG. 7) and the second cover 54 (FIG. 5). The chamber 74 defines a pivot axis 92, and the paddle 78 and the shaft 86 rotate in a first direction 94 (FIG. 8) and a second direction 96 about the pivot axis 92 (FIG. 8). As used herein, the term "radial" and variants thereof refers to a direction that is perpendicular to the pivot axis 92, and the term "axial" and variants thereof refers to a direction that is parallel to the pivot axis 92. The paddle 78 and dam 82 are positioned within the chamber 74 such that each extends radially from the pivot axis 92.

Figure 11:
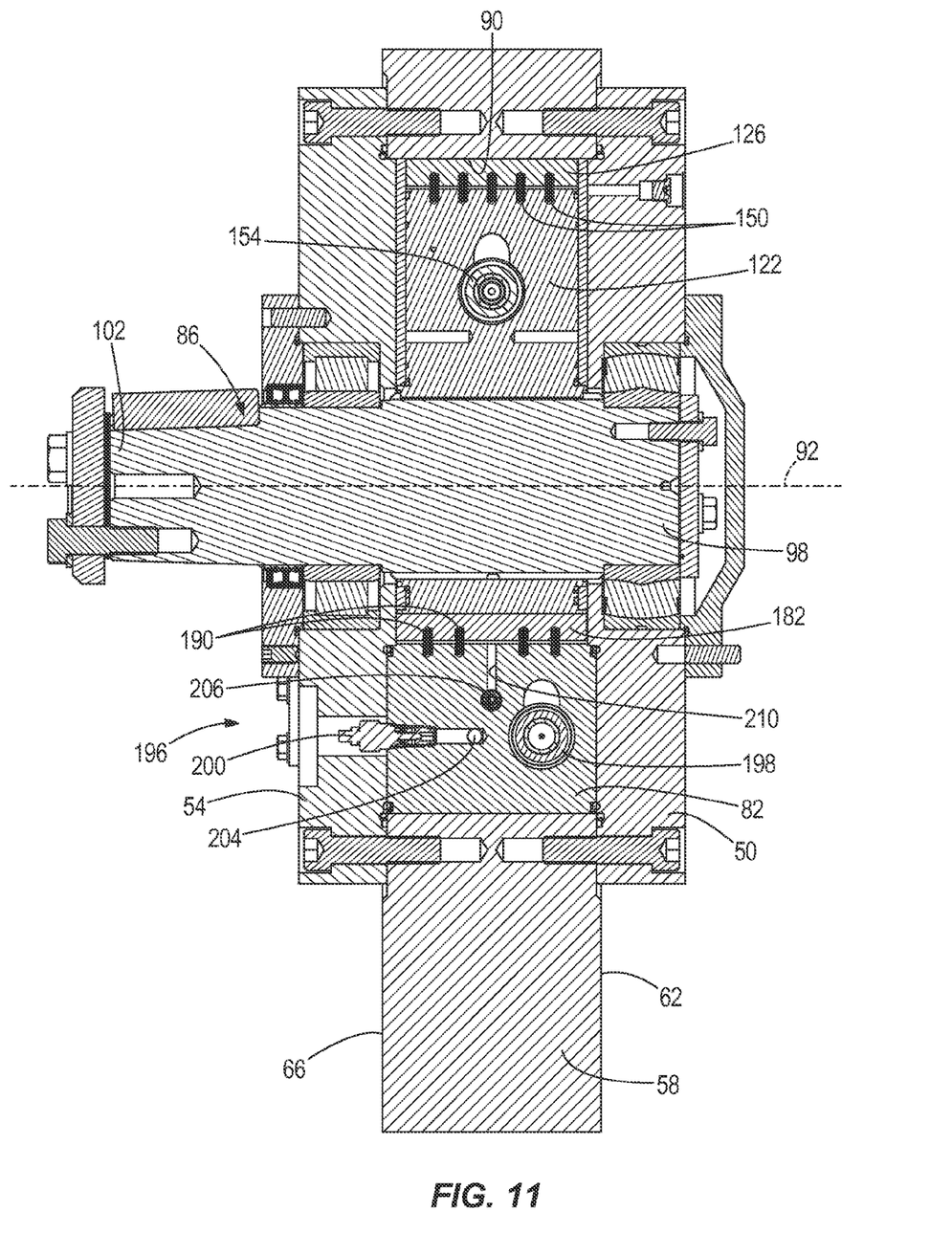
FIG. 11 is a section view of the snubber of FIG. 6 taken along line 11-11.

Referring to FIGS. 7 and 11, the shaft 86 extends from the first cover 50 through the second cover 54 to a position outside of the chamber 74, and includes a first end 98 (FIG. 11) proximate the first cover 50 and a second end 102 located outside of the chamber 74 and proximate the second cover 54 (FIG. 11). The shaft 86 includes an external spline portion 106 (FIG. 8) located within the chamber 74. The second end 102 is coupled to the second end 46 of the snubber arm 38 (FIG. 2). In the illustrated embodiment, the first end 98 extends partially through the first cover 50. In other embodiments, the first end 98 extends completely through the first cover 50.

As shown in FIG. 8, the paddle 78 and dam 82 substantially partition the chamber 74 into a first portion 110 and a second portion 114. The paddle 78 includes a mounting sleeve 118 (FIG. 10), an arm 122, a paddle vane 126, and a paddle valve assembly 130. The mounting sleeve 118 includes an internal spline portion 134 for engaging the external spline portion 106 of the shaft 86 and is rotatable about the pivot axis 92. The arm 122 extends radially from the mounting sleeve 118 toward the sealing wall 90. The arm 122 includes a first side 138 (FIG. 9) adjacent the first portion 110 of the chamber 74, a second side 142 (FIG. 9) adjacent the second portion 114 of the chamber 74, and an arm end 146 (FIG. 9) positioned adjacent the sealing wall 90. The paddle vane 126 is located within the arm 122 proximate the arm end 146. The paddle vane 126 is biased by paddle springs 150 toward an extended position such that the vane 126 extends from the arm end 146 to contact the sealing wall 90, sealing the first portion 110 and the second portion 114 of the chamber 74.

Figure 9:
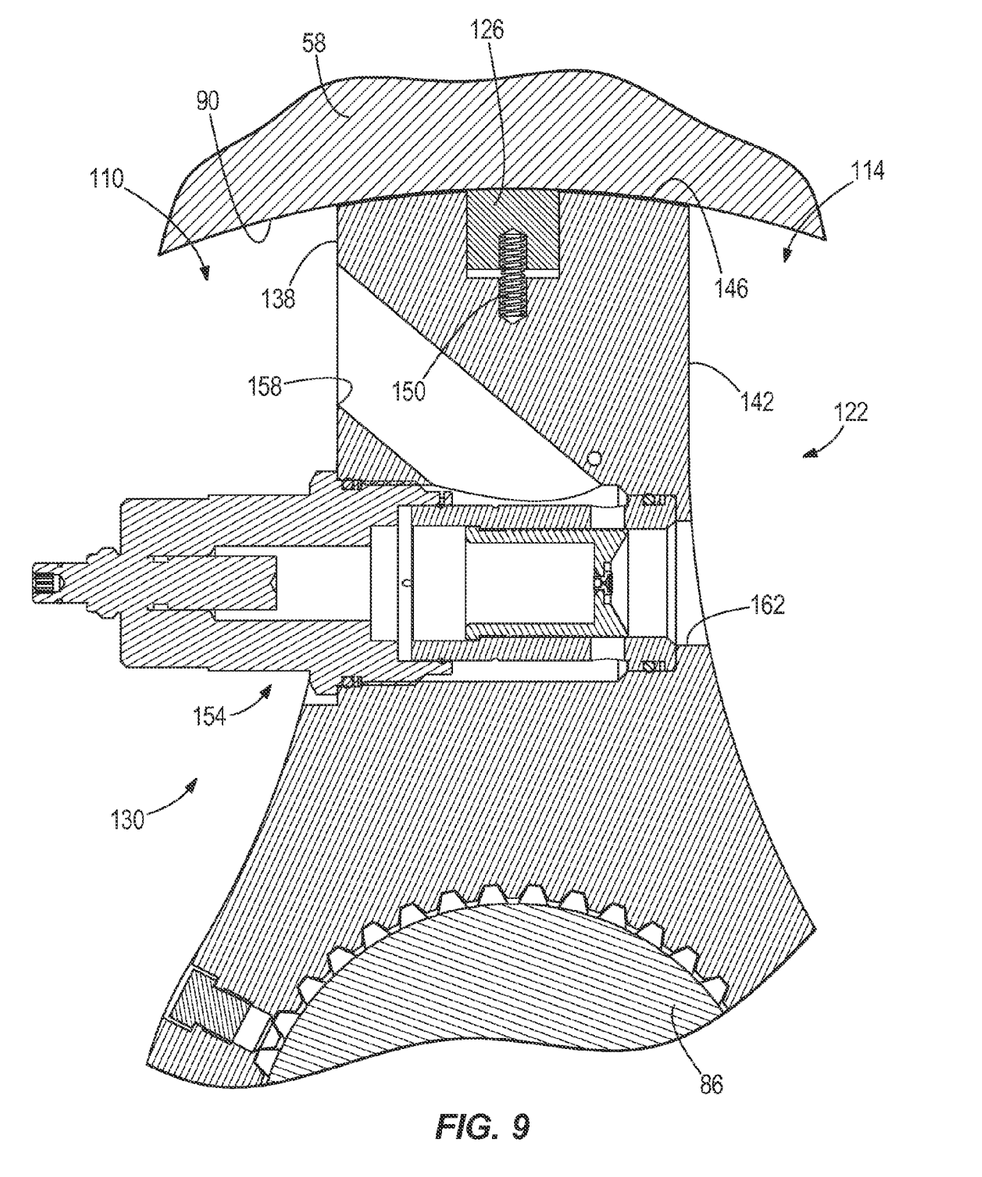
FIG. 9 is an enlarged section view of a paddle of the snubber of FIG. 8.

As shown in FIG. 9, the paddle valve assembly 130 includes a relief valve 154, which has a first port 158 and a second port 162. The first port 158 is located on the first side 138 of the paddle arm 122 and is in fluid communication with the first portion 110 of the chamber 74. The second port 162 is located on the second side 142 of the arm 122 and is in fluid communication with the second portion 114 of the chamber 74. If the pressure in the second portion 114 of the chamber 74 exceeds a relief pressure, the relief valve 154 opens, thereby permitting fluid flow through the first port 158 and into the first portion 110 of the chamber 74. The relief valve 154 only opens in one direction, and will not open if the pressure is greater in the first portion 110 than in the second portion 114.

Referring again to FIG. 8, the dam 82 is secured in a stationary position within the chamber 74. The dam 82 includes a first end 166 (FIG. 10) adjacent the sealing wall 90, a second end 170 (FIG. 10) adjacent the mounting sleeve 118, a first side 174 (FIG. 10) adjacent the first portion 110 of the chamber 74, and a second side 178 (FIG. 10) adjacent the second portion 114 of the chamber 74. The dam 82 further includes a dam vane 182 and a dam valve assembly 186. The dam vane 182 is located within the dam 82 proximate the second end 170 of the dam 82. The dam vane 182 is biased by dam springs 190 toward an extended position such that the dam vane 182 extends from the second end 170 to contact the mounting sleeve 118, thereby sealing the first portion 110 of the chamber 74 from the second portion 114.

Figure 10:
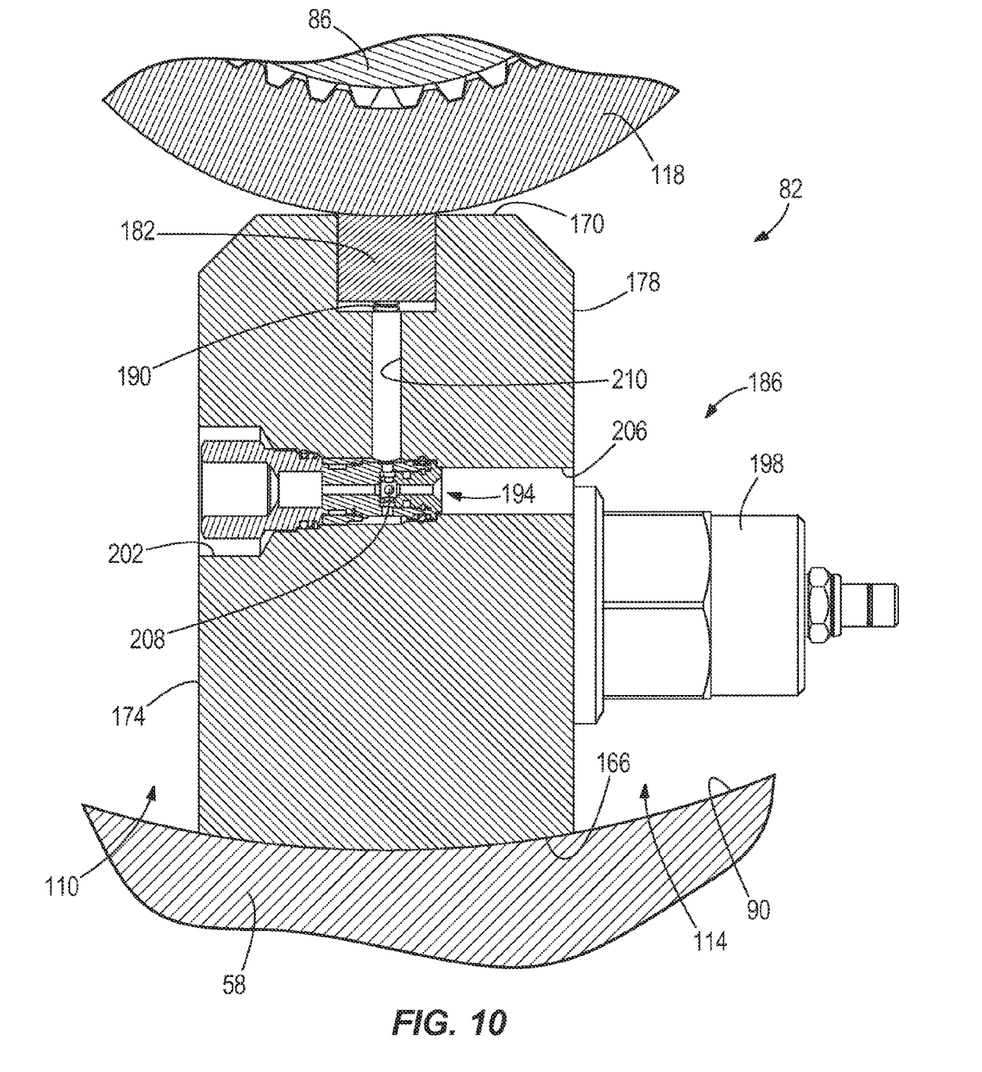
FIG. 10 is an enlarged section view of a dam of the snubber of FIG. 8.

As shown in FIGS. 10 and 11, the dam valve assembly 186 includes a shuttle valve 194, a needle valve 196 (FIG. 11), and a relief valve 198. The shuttle valve 194 includes a first port 202 located on the first side 174 of the dam 82, a second port 206 located on the second side 178 of the dam 82, a shuttle member 208, and a vane channel 210. The vane channel 210 provides fluid communication between the shuttle valve 194 and the dam vane 182. The paddle 78, the paddle valve assembly 130 and the dam valve assembly 186 together constitute a means for dampening rotation of the shaft 86 in the first direction 94 and the second direction 96.

Referring to FIG. 11, the needle valve 196 includes a needle 200 and a passage 204 extending between the first side 174 of the dam 82 and the second side 178 of the dam 82 and providing fluid communication between the first portion 110 and the second portion 114. Screwing the needle 200 into the passage 204 causes the passage 204 to become more blocked by the needle 200, while unscrewing the needle 200 away from the passage 204 opens the passage 204 to become more open.

Although not shown in detail in FIG. 10, the relief valve 198 operates in a manner similar to the relief valve 154 described above in the paddle valve assembly 130. However, the relief valve 198 operates in the opposite direction of relief valve 154. Stated another way, the relief valve 198 permits fluid flow to the second portion 114 of the chamber 74 when the pressure in the first portion 110 exceeds a predetermined relief pressure. In this way, each relief valve 154, 198 provides pressure relief during one direction of rotation of the paddle 78. In one embodiment, the pressure difference between the first portion 110 and the second portion 114 during rotation of the paddle 78 is in the range of approximately 300 psi to approximately 1000 psi and the relief valves 154, 198 open when the pressure difference between the first portion 110 and the second portion 114 exceeds approximately 1000 psi. In other embodiments, both relief valves 154 and 198 may be housed within the dam 82, or both may be housed within the paddle 78.

To close the dipper door 22, the operator moves the dipper 16 toward the bumper 14a (FIG. 1). As the dipper 16 moves toward the bumper, the dipper door 22 pivots about the door pin 26 toward the dipper body 18. Rotation of the door 22 causes the snubber arm 38 to rotate, which in turn rotates the shaft 86 about the pivot axis 92 in the first direction 94. The main body 58 is coupled to the dipper body 18 and therefore remains stationary with respect to the dipper door 22 during this motion. Due to the engagement of the mounting sleeve internal spline portion 134 and the external spline portion 106 of the shaft 86, rotation of the shaft 86 drives the paddle 78 to rotate toward the first portion 110 of the chamber 74 (counter-clockwise as shown in FIG. 8). Rotation of the paddle arm 122 is resisted, or dampened, by the hydraulic fluid in the first portion 110 of the chamber 74. The paddle vane 126 seals the arm end 146 against the sealing wall 90, preventing fluid from flowing between the arm end 146 and the sealing wall 90 and passing from the first portion 110 to the second portion 114. Likewise, the dam vane 182 seals the second end 170 of the dam 82 against the mounting sleeve 118, preventing fluid from flowing between the second end 170 and the mounting sleeve 118.

Rotation of the paddle 78 against the sealed first portion 110 increases the pressure in the first portion 110 of the chamber 74, creating a higher pressure in the first portion 110 than in the second portion 114. This pressure increase causes fluid to flow through the passage 204 (FIG. 11) and into the second portion 114. The flow through passage 204 may be adjusted externally by rotation of the needle valve 196. If the needle 200 is tightened, the needle 200 at least partially obstructs the passage 204, reducing the fluid flow from the first portion 110 to the second portion 114. This increases the fluid pressure in the first portion 110, resulting in a dampening action that is more "stiff". If, on the other hand, the needle 200 is loosened, the passage 204 permits greater fluid flow, and the dampening effect is lessened. In this way, the needle valve 196 allows external, manual adjustment of the dampening force exerted by the snubber 30 on the dipper door 22. If the pressure in the first portion 110 of the chamber 74 exceeds a predetermined relief pressure, the dam relief valve 198 opens, permitting fluid to flow to the second portion 114 of the chamber 74.

The pressure increase in the first portion 110 due to the rotation of the paddle 78 also causes fluid to flow into the first port 202 of the dam shuttle valve 194. As fluid enters the first port 202, the shuttle valve 194 senses the pressure difference between the first portion 110 and the second portion 114. The higher pressure in the first portion 110 shifts the shuttle member 208 to close the second port 206 and place the first port 202 in communication with the vane channel 210. The fluid flowing into the vane channel 210 from the first portion 110 applies hydraulic pressure on the dam vane 182. The pressure pushes the dam vane 182 against the mounting sleeve 118, supplementing the biasing force of the dam springs 190 to increase the sealing force exerted on the dam vane 182. In this way, the shuttle valve 194 utilizes the pressure difference between the first portion 110 and the second portion 114 to increase the sealing efficiency of the dam vane 182.

To open the dipper door 22, the operator triggers a latch mechanism 28 (FIG. 2). When the dipper door 22 is unlatched, the door 22 swings down and away from the dipper body 18 about the door pin 26. In this case, the snubber arm 38 rotates in the second direction 96. This causes the paddle 78 to rotate against the second portion 114 of the chamber 74 (clockwise as shown in FIG. 8). Rotation of the paddle 78 increases the pressure in the second portion 114 of the chamber 74, causing fluid to flow into the second port 206 of the dam shuttle valve 194 and into the needle valve passage 204. If the pressure in the second portion 114 of the chamber 74 exceeds a predetermined pressure, the paddle relief valve 154 opens, permitting increased fluid flow to the first portion 110 of the chamber 74. The needle valve 196 behaves in a similar manner to that described above during closing of the dipper door 22. The shuttle valve 194 shifts to close the first port 202 and places the second port 206 in communication with the vane channel 210. The fluid applies hydraulic pressure on the dam vane 182 as described above during the closing phase.

The needle valve 196 permits flow of hydraulic fluid in both directions (i.e., from the first portion 110 to the second portion 114 and vice versa). The needle valve 196 eliminates the need for an external valve assembly to provide fluid communication between the first portion 110 and the second portion 114. In addition, because the shuttle valve 194, needle valve 196, and the combination of relief valves 154, 198 provide dampening, or snubbing action, in both directions of rotation, the snubber 30 may be used on either side of the dipper 16. This eliminates the need to configure a separate snubber 30 for each side of the dipper 16.

Referring again to FIG. 8, the dam vane 182 acts against the mounting sleeve 118 at a first radius 218. The paddle vane 126 acts against the sealing wall 90 at a second radius 222 greater than the first radius 218. During rotation, the dam vane 182 moves relative to the mounting sleeve 118 through an arc distance proportional to the first radius 218, while the paddle vane 126 moves relative to the sealing wall 90 through an arc distance proportional to the second radius 222. Since the second radius 222 is greater than the first radius 218, the paddle vane 126 moves through a greater distance and is subjected to greater wear than the dam vane 182. In addition, the greater travel distance means that the paddle vane 126 is exposed to more surface area and is therefore more likely to encounter manufacturing irregularities in the sealing wall 90 than the dam vane 182 encounters on the mounting sleeve 118.

Figure 12:
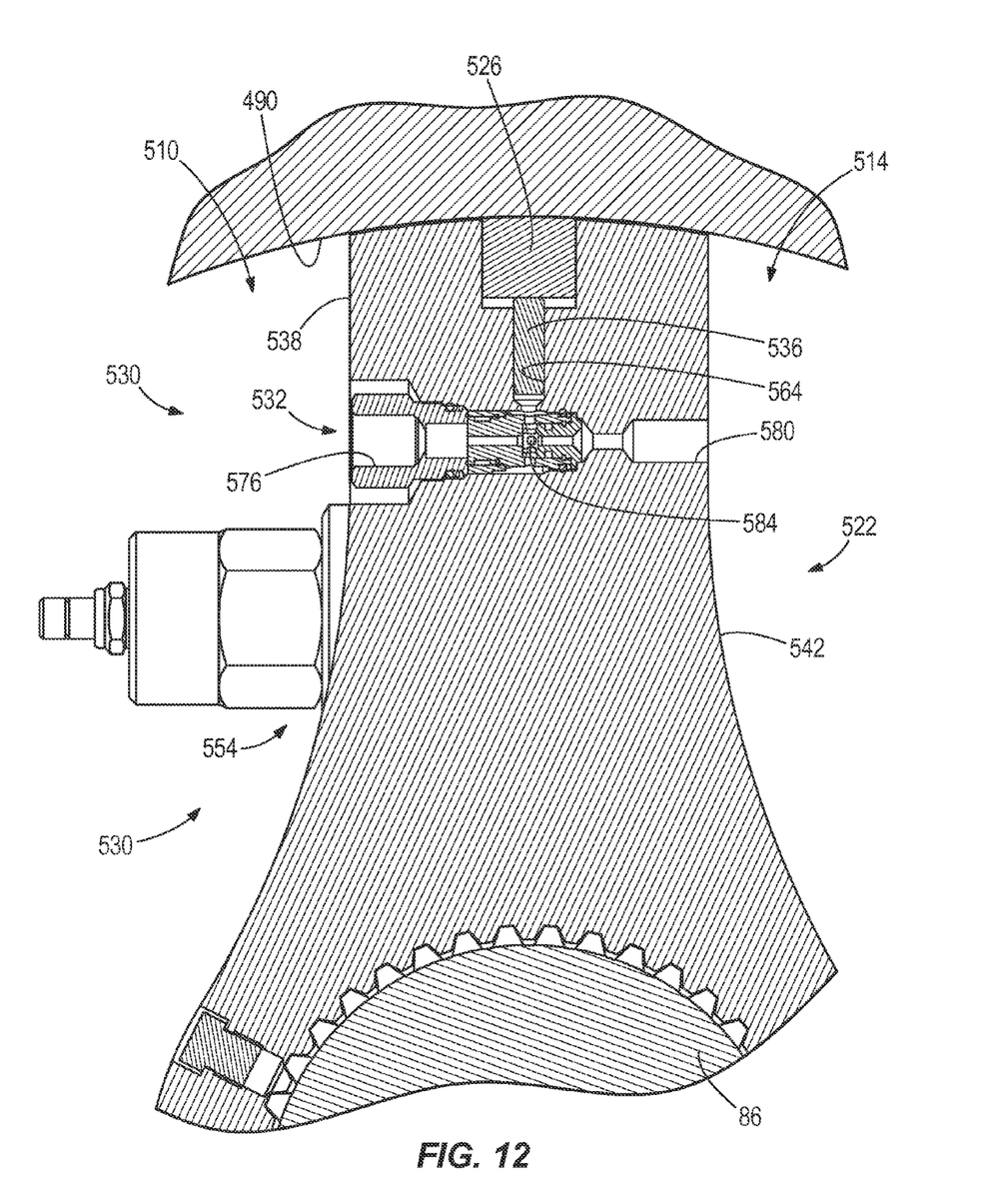
FIG. 12 is an enlarged section view of a paddle according to another embodiment.

FIG. 12 illustrates a paddle valve assembly 530 according to another embodiment. The paddle valve assembly 530 includes a paddle arm 522 that is similar to the paddle arm 122 of the snubber 30 discussed above in regard to FIGS. 1-11, and only differences between the paddle valve assemblies 130 and 530 will be discussed herein. Similar structures are referred to with similar reference numbers, plus 400.

As shown in FIG. 12, the paddle valve assembly 530 includes a shuttle valve 532, a piston or dowel pin 536 adjacent a paddle vane 526, and a relief valve 554. The shuttle valve 532 includes a third port 576, a fourth port 580, a shuttle member 584, and a vane channel 564. The third port 576 is located on a first side 538 of a paddle arm 522 and is in fluid communication with a first portion 510 of a chamber 474. The fourth port 580 is located on a second side 542 of the paddle arm 522 and is in fluid communication with a second portion 514 of the chamber 474. The dowel pin 536 is slidably positioned in the vane channel 564, and the vane channel 564 provides fluid communication with the dowel pin 536. The relief valve 554 is similar to the relief valve 154.

In the embodiment of FIG. 12, the paddle shuttle valve 532 senses the pressure difference between the first portion 510 and the second portion 514. If, for example, the pressure is greater in the first portion 510 than the second portion 514, the pressure difference shifts the shuttle member 584 to close the fourth port 580 and place the third port 576 in communication with the vane channel 564. Fluid flows into the vane channel 564 and applies hydraulic pressure on the dowel pin 536. The pressure on the dowel pin 536 pushes the paddle vane 526 against a sealing wall 490, supplementing the biasing force of paddle springs (not shown) to increase the sealing force exerted on the paddle vane 526. Alternatively, the paddle valve assembly 530 may omit paddle springs so that only the dowel pin 536 acts on the paddle vane 526.

Inclusion of the piston or dowel pin 536 in the paddle valve assembly 530 creates a greater sealing force on the paddle vane 526 than if the fluid acted directly on the paddle vane 526. This is due to the fact that the dowel pin 536 has a smaller surface area than the paddle vane 526, which amplifies the hydraulic force. The greater sealing force causes the dowel pin 536 to maintain a closer fit between the paddle vane 526 and the sealing wall 490 than if the fluid acted directly on the vane 526. The closer fit between the paddle vane 526 and sealing wall 490 due to the dowel pin 536 increases the paddle vane's 526 sealing efficiency throughout the range of motion. In other embodiments, the dam vane assembly may also utilize a dowel pin to apply greater sealing force on the dam vane against a mounting sleeve.

In still other embodiments, the paddle valve assembly 130 may be configured to divert a portion of the fluid to apply pressure to a thrust plate (not shown) placed between the paddle and the first cover, and a thrust plate placed between the paddle and the second cover. Similarly, the dam valve assembly 186 may be configured to divert a portion of the fluid to apply pressure to a thrust plate (not shown) placed between the dam and the first cover, and a thrust plate placed between the dam and the second cover. The thrust plates provide additional sealing by preventing fluid from leaking between the paddle or dam and the housing covers.

Thus, the invention provides, among other things, a snubber for a dipper door. Various features of the invention are set forth in the following claims.

The invention claimed is:

1. A snubber for a mining shovel, the mining shovel including a dipper having a dipper body and a dipper door rotatably coupled to the dipper body, the snubber comprising:
   a housing including an internal wall defining a fluid-filled chamber;
   a shaft rotatably coupled to the housing and including a portion positioned within the chamber, wherein rotation of the dipper door relative to the dipper body causes rotation of the shaft relative to the housing;
   a paddle positioned within the chamber and coupled to the shaft such that the paddle rotates with the shaft, the paddle including a first side, a second side, and a paddle end extending between the first side and the second side, the paddle end including a channel;
   a shuttle valve including a first port positioned on the first side of the paddle and a second port positioned on the second side of the paddle, and a shuttle member movable between a first position in which the first port is in fluid communication with the channel and a second position in which the second port is in fluid communication with the channel;
   a paddle vane positioned adjacent the paddle end and biased toward the internal wall;
   a piston including a first end positioned in the channel and a second end positioned adjacent the paddle vane;
   a dam positioned within the chamber such that the dam and the paddle substantially partition the internal chamber into a first portion adjacent the first side of the paddle and a second portion adjacent the second side of the paddle;
   a first valve for controlling fluid flow from the first portion to the second portion; and
   a second valve for controlling fluid flow from the second portion to the first portion,
   wherein when pressure in the first portion is greater than pressure in the second portion, the shuttle member moves to the first position such that fluid in the first portion is in communication with the channel and applies pressure against the first end of the piston to bias the paddle vane toward the internal wall.

2. The snubber of claim 1, the paddle further including a mounting sleeve, wherein the mounting sleeve engages the shaft to couple the paddle to the shaft.

3. The snubber of claim 2, the dam further including a dam vane adjacent the mounting sleeve to seal the first portion from the second portion.

4. The snubber of claim 3, the dam further including a shuttle valve such that, when the first portion has a higher pressure than the second portion of the chamber, the shuttle valve diverts fluid from the first portion to apply pressure against the dam vane to bias the dam vane toward the mounting sleeve.

5. The snubber of claim 1, further comprising a channel providing fluid communication between the first portion and the second portion and a needle valve for closing and opening the channel, wherein adjustment of the needle valve changes the rate of fluid flow through the channel between the first portion and the second portion.

6. The snubber of claim 1, further comprising an arm coupled to the shaft such that when the dipper door rotates relative to the dipper body, the arm and shaft rotate relative to the housing.

7. The snubber of claim 1, the housing further including a first wall and a second wall, wherein the shaft extends through the first wall such that a first end of the shaft is positioned outside the chamber and is coupled to the dipper door while a portion of the shaft is positioned within the chamber.

8. The snubber of claim 1, wherein when pressure in the second portion is greater than pressure in the first portion, the shuttle member moves to the second position such that fluid in the second portion is in communication with the channel and applies pressure against the first end of the piston to bias the paddle vane toward the internal wall.

9. A dipper for a mining shovel, the dipper comprising:
   a dipper body for receiving material;
   a dipper door rotatably coupled to the dipper body; and
   a snubber including:
      a housing including an internal wall defining a fluid-filled chamber;

a shaft rotatably coupled to the housing and including a portion positioned within the chamber, the shaft being coupled to one of the dipper door and the dipper body such that rotation of the dipper door relative to the dipper body causes rotation of the shaft relative to the housing;

a paddle positioned within the chamber and coupled to the shaft such that the paddle rotates with the shaft, the paddle including a first side, a second side, and a paddle end extending between the first side and the second side, the paddle end including a channel;

a shuttle valve including a first port positioned on the first side of the paddle and a second port positioned on the second side of the paddle, and a shuttle member movable between a first position in which the first port is in fluid communication with the channel and a second position in which the second port is in fluid communication with the channel;

a paddle vane positioned adjacent the paddle end and biased toward the internal wall;

a piston including a first end positioned in the channel and a second end positioned adjacent the paddle vane;

a dam positioned within the chamber such that the dam and the paddle substantially partition the internal chamber into a first portion adjacent the first side of the paddle and a second portion adjacent the second side of the paddle;

a first valve for controlling fluid flow from the first portion to the second portion; and a second valve for controlling fluid flow from the second portion to the first portion, wherein when pressure in the first portion is greater than pressure in the second portion, the shuttle member moves to the first position such that fluid in the first portion is in communication with the channel and creates pressure on the first end of the piston to bias the paddle vane toward the internal wall.

10. The dipper of claim 9, wherein the paddle end is a first end and is positioned proximate the internal wall and the paddle includes a second end coupled to the shaft, and the dam further including a dam vane adjacent the second end of the paddle to seal the first portion from the second portion.

11. The dipper of claim 10, the dam further including a shuttle valve such that, when the first portion has a higher pressure than the second portion of the chamber, the shuttle valve diverts fluid from the first portion to apply pressure against the dam vane to bias the dam vane toward the second end of the paddle.

12. The dipper of claim 9, further comprising a needle valve and a channel providing fluid communication between the first portion and the second portion, wherein the needle valve is extendable into the channel to at least partially block the channel, such that adjustment of the needle valve changes the rate of fluid flow through the channel between the first portion and the second portion.

13. The dipper of claim 9, the housing further including a first wall and a second wall, wherein the shaft extends through the first wall such that a first end of the shaft is positioned outside the chamber and is coupled to the dipper door while a portion of the shaft is positioned within the chamber.

14. The dipper of claim 9, wherein when pressure in the second portion is greater than pressure in the first portion, the shuttle member moves to the second position such that fluid in the second portion is in communication with the channel and applies pressure against the first end of the piston to bias the paddle vane toward the internal wall.

15. A snubber for a mining shovel, the mining shovel including a dipper having a dipper body and a dipper door rotatably coupled to the dipper body, the snubber comprising:

a housing including an internal wall defining a chamber, the chamber defining a pivot axis;

a shaft rotatably coupled to the housing and including a portion positioned within the chamber, the shaft being rotatable about the pivot axis in a first direction and a second direction, wherein rotation of the dipper door relative to the dipper body causes rotation of the shaft relative to the housing;

a paddle positioned within the chamber and including a first end proximate the internal wall and a second end coupled to the shaft, the paddle rotating with the shaft about the pivot axis, the paddle further including a first side, a second side, and a channel adjacent the first end;

a shuttle valve including a first port positioned on the first side of the paddle and a second port positioned on the second side of the paddle, and a shuttle member movable between a first position in which the first port is in fluid communication with the channel and a second position in which the second port is in fluid communication with the channel, rotation of the paddle in a first direction causing fluid adjacent the first side of the paddle to have higher pressure than fluid adjacent the second side of the paddle, thereby moving the shuttle member to the first position;

a paddle vane positioned adjacent the first end of the paddle and adjacent the internal wall;

a piston including a first end positioned in the channel and a second end positioned adjacent the paddle vane, the fluid having higher pressure applying pressure against the first end of the piston to bias the paddle vane toward the internal wall; and a valve assembly for dampening rotation of the paddle and shaft in the first direction and the second direction.

16. The snubber of claim 15, the valve assembly including a first relief valve to permit fluid flow in a first direction and a second relief valve to permit fluid flow in a second direction.

17. The snubber of claim 15, wherein the paddle partitions the chamber into a first portion and a second portion.

18. The snubber of claim 17, wherein the valve assembly includes a first valve for controlling fluid flow from the first portion to the second portion, and a second valve for controlling fluid flow from the second portion to the first portion.

19. The snubber of claim 17, further comprising a needle valve and a channel providing fluid communication between the first portion and the second portion, wherein the needle valve is extendable into the channel to at least partially block the channel, such that adjustment of the needle valve changes the rate of fluid flow through the channel between the first portion and the second portion.

20. The snubber of claim 15, the housing further including a dam that cooperates with the paddle to substantially partition the chamber into a first portion and a second portion, the dam including a dam vane adjacent the second end of the paddle to seal the first portion from the second portion.

21. The snubber of claim 20, the valve assembly including a shuttle valve such that a pressure difference between the first portion and the second portion causes the shuttle valve to divert fluid from a portion having higher pressure to apply hydraulic pressure against the dam vane and bias the dam vane toward the second end of the paddle.

22. The snubber of claim 15, wherein rotation of the paddle in a second direction opposite the first direction causes fluid adjacent the second side of the paddle to have higher pressure than fluid adjacent the first side of the paddle, thereby moving the shuttle member to the second position, such that the fluid in the second portion applies pressure against the first end of the piston to bias the paddle vane toward the internal wall.

23. A snubber for a mining shovel, the mining shovel including a dipper having a dipper body and a dipper door rotatably coupled to the dipper body, the snubber comprising:
- a housing including an internal wall defining a chamber, the chamber defining a pivot axis;
- a shaft rotatably coupled to the housing and including a portion positioned within the chamber, the shaft being rotatable about the pivot axis in a first direction and a second direction, wherein rotation of the dipper door relative to the dipper body causes rotation of the shaft relative to the housing;
- a paddle positioned within the chamber and partitioning the chamber into the first portion and the second portion, the paddle including a first end proximate the internal wall and a second end coupled to the shaft, the paddle rotating with the shaft about the pivot axis, the paddle further including a first side adjacent the first portion of the chamber, a second side adjacent the second portion of the chamber, and a channel adjacent the first end;
- a shuttle valve including a first port positioned on the first side of the paddle and a second port positioned on the second side of the paddle, and a shuttle member movable between a first position in which the first port is in fluid communication with the channel and a second position in which the second port is in fluid communication with the channel;
- a paddle vane positioned adjacent the first end of the paddle;
- a piston including a first end positioned in the channel and a second end positioned adjacent the paddle vane, the piston biasing the paddle vane toward the internal wall, when pressure in the first portion is greater than pressure in the second portion, the shuttle member moves to the first position such that fluid in the first portion is in communication with the channel and applies pressure against the first end of the piston to bias the paddle vane toward the internal wall; and
- a means for dampening rotation of the shaft in the first direction and the second direction.

24. The snubber of claim 23, wherein the means for dampening rotation of the shaft includes a first valve assembly and a second valve assembly, the first valve assembly including a first relief valve permitting fluid to flow from the first portion to the second portion, the second valve assembly including a second relief valve permitting fluid to flow from the second portion to the first portion.

25. The snubber of claim 23, wherein when pressure in the second portion is greater than pressure in the first portion, the shuttle member moves to the second position such that fluid in the second portion is in communication with the channel and applies pressure against the first end of the piston to bias the paddle vane toward the internal wall.

* * * * *